Nov. 26, 1968 S. PASTROVICH, SR 3,412,499
FISHING ROD HOLDER AND TRIGGER
Filed Sept. 30, 1965 2 Sheets-Sheet 1
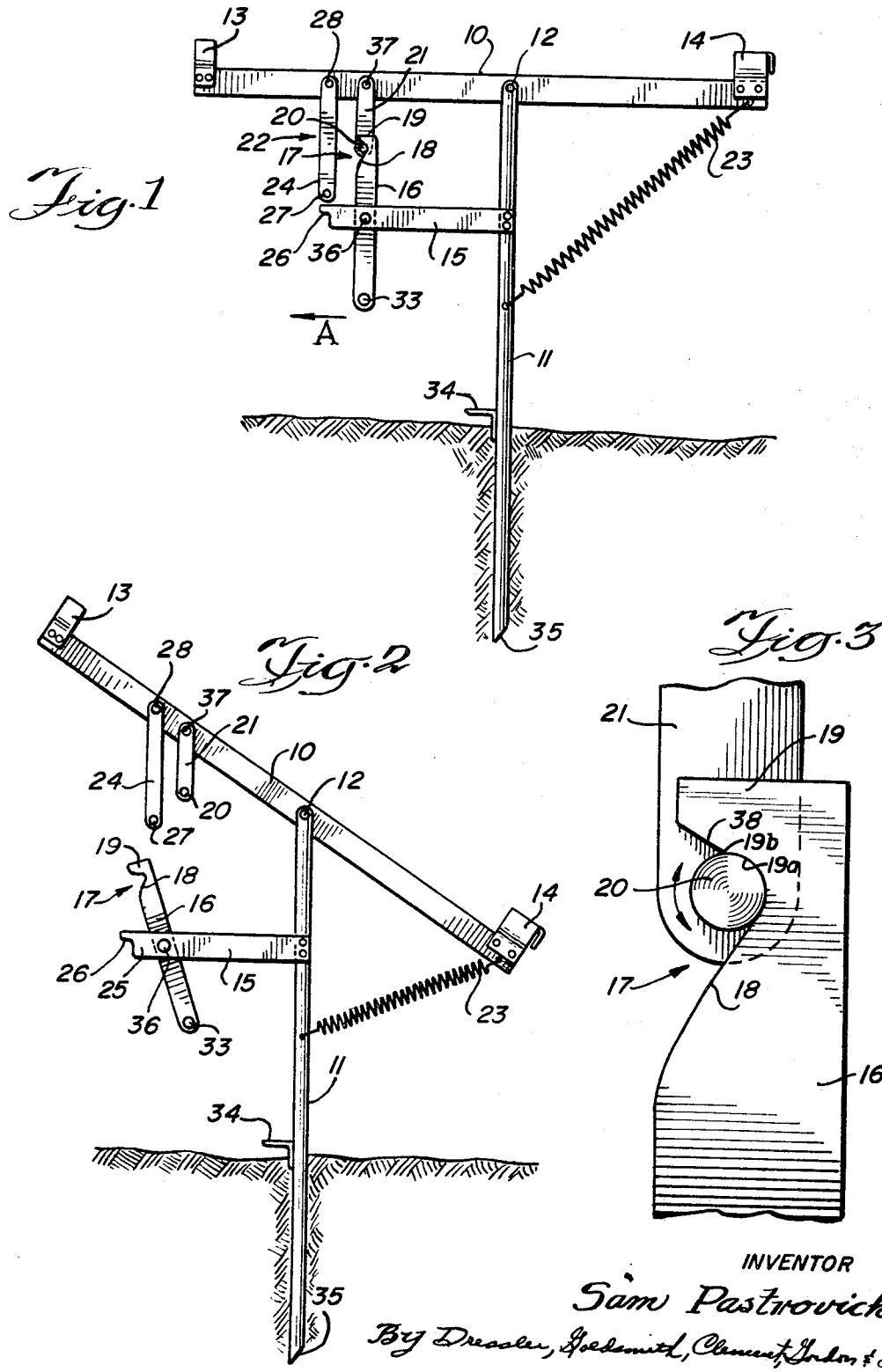
INVENTOR
Sam Pastrovich Sr.
By Dressler, Goldsmith, Clement, Gordon & Todd
ATTORNEYS

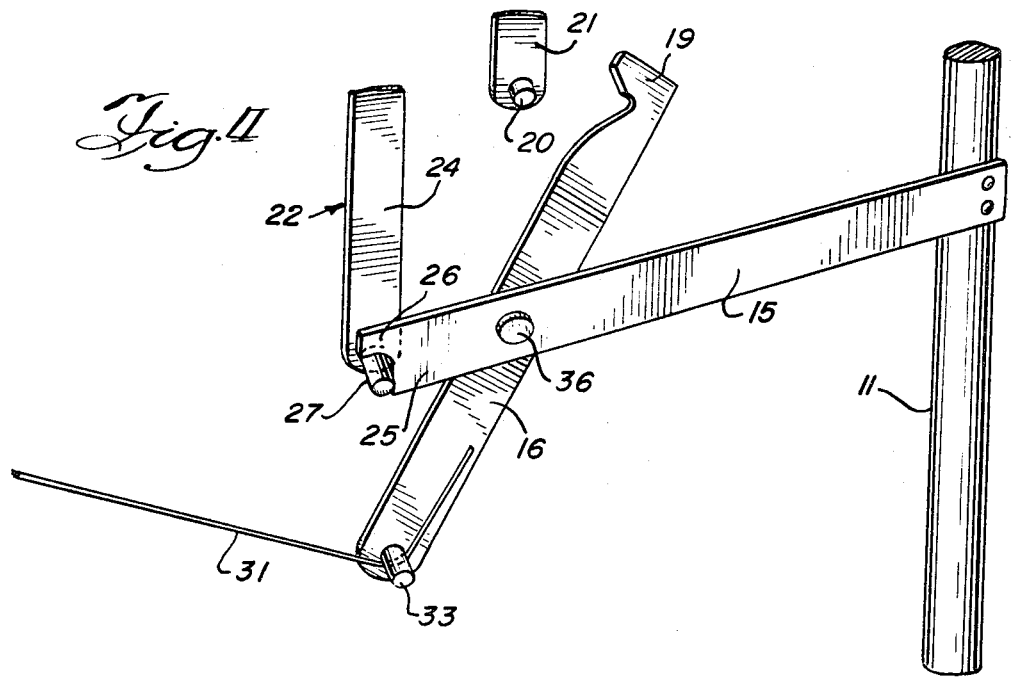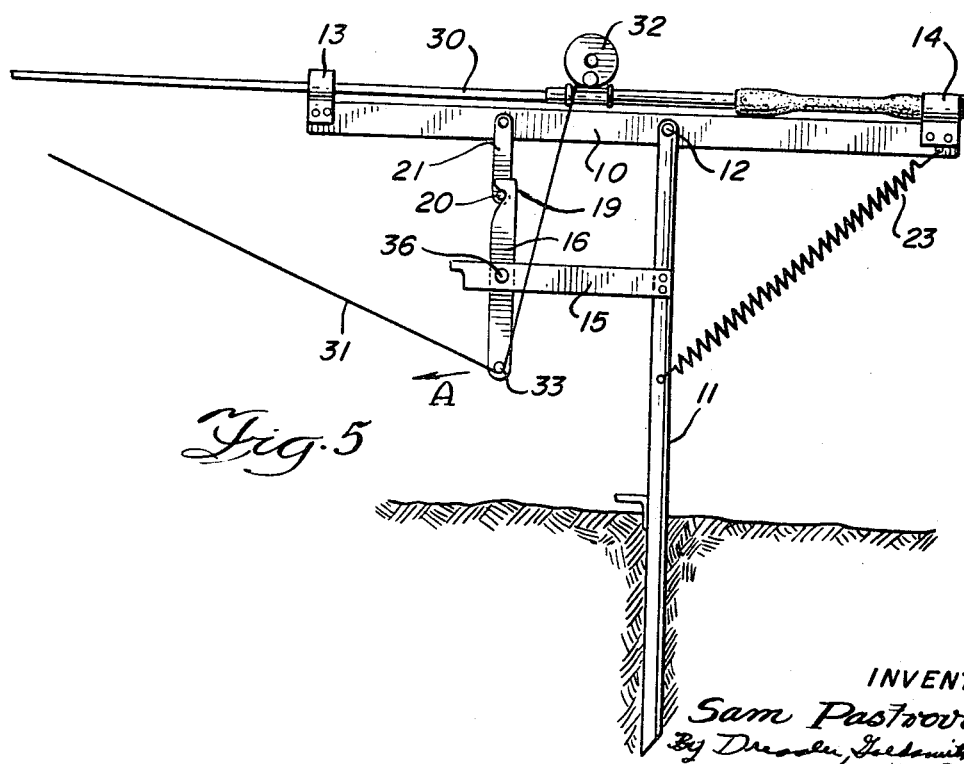

United States Patent Office 3,412,499
Patented Nov. 26, 1968

3,412,499
FISHING ROD HOLDER AND TRIGGER
Sam Pastrovich, Sr., Box 27, Morrisonville, Ill. 62546
Filed Sept. 30, 1965, Ser. No. 491,694
3 Claims. (Cl. 43—15)

ABSTRACT OF THE DISCLOSURE

A fishing pole holder has a trigger latch mechanism which includes two pivoted elements interengageable with each other under tension. The preferred latch mechanism comprises a rotatable round pin carried by a fishing pole support arm, and a hook carried by a pivotally mounted latch element on a vertical post, with a confining surface on the hook which terminates just beyond the vertical diameter of the rotatable round pin. A safety device may be included for use while the trigger mechanism is being set.

---

This invention relates to fishing rod holders, and particularly those which are trigger actuated by tension applied to the fishing line by the bite of a fish to move the pole into an upright position and impose a jerking movement on the line to set the hook in the mouth of the fish.

Fishing rod holders which are trigger actuated as indicated are in common use. However, the known devices are not sufficiently sensitive to the action of a fish pulling on the baited line, and do not react as well as is desired. Also, the known devices, in an effort to increase the sensitivity of release and the effectiveness of the hook-setting action, have been quite intricate in structure with many members to adjust before the fishing rod can be set in the holder with the line in the water. Accordingly, the present invention emphasizes simplicity of structure, ease of employment and sensitivity of the releasing action.

In accordance with the invention, a fishing rod holder including a hook-setting mechanism is provided with a rod support arm pivotally mounted for movement between a generally horizontal position and a generally upright position with spring means biasing this arm toward its upright position. In use, the fishing rod is normally maintained by the support arm in a generally horizontal position and latch means are provided for holding the arm of this horizontal position against the pressure of the spring. In the background of this combination, the invention provides several improvements which function to provide a more sensitive and effective release of the rod support arm and an improved hook-setting action.

One point to be stressed is the fact that two interengageable latch elements are used, with each of these being pivoted. One of the latch elements is engageable with the fishing line at a point remote from the line of the fishing rod. In this way, when the fish puts tension on the line, the two pivotal latch elements release easily from one another so that the spring can pivot the fishing rod into a more nearly upright position.

Another feature of the invention is the employment of a pivotal latch element which carries a hook for holding the rod support arm by engagement of the hook with a rotatable round pin carried by the arm. In the invention, the hook defines a notch for receiving the round pin with the notch forming a finger which engages the round pin and terminates just beyond the tangential contact point between the two. Thus, the slightest jarring of the latch by tension imposed on the line will cause the rotatable round pin to be released from the hook.

Still another feature of importance is the utilization of an auxiliary safety latch mechanism to enable the fishing rod and line to be manipulated and adjusted before the main latch mechanism is interengaged. In the invention, this auxiliary latch mechanism is too short to come into action when the main latch mechanism is relied upon and structure is provided whereby manipulation of the main latch element can be used to disengage the auxiliary latch mechanism as will be more fully defined hereinafter.

The foregoing, as well as other features of the invention, will be more fully understood from the illustrative embodiments of the invention shown in the accompanying drawings in which:

FIG. 1 is a side elevation of the device in its set position;

FIG. 2 is a side elevation of the device in its released position;

FIG. 3 is an enlarged partial view of the hook and roller bearing structure used to provide a more sensitive release action;

FIG. 4 is an enlarged pictorial view of the auxiliary latch mechanism; and

FIG. 5 is a side elevation of the device showing the fishing rod and line as they would appear in use, the auxiliary mechanism being absent from this illustration.

Referring first to FIG. 1, the fishing rod would be supported by a rod support arm identified at 10 and which is pivotally secured to the upper end of a generally vertical post 11, the pivot being identified at 12. The support arm 10 carries fishing rod clamp elements 13 and 14 which carry the fishing rod and which are of conventional structure. The post 11 is inserted in the ground and carries a forward extension 15 which is fixedly secured to the post 11 as by welding. The extension 15 pivotally carries a latch element 16 which is formed at its upper end with a notch 17 shaped, as detailed in FIG. 3, to include a sloped portion 18 and a finger 19 which, together, present a forwardly facing hook. This hook interengages with a rotatable round pin 20 which is carried at the free lower end of another latch element 21 which is carried by the forward end of the support arm 10 pivoted on said post 11 as described above. The latch element 21 is pivotally supported as indicated at 37 and, the fact that two pivotally mounted latch elements are used, facilitates the release action and makes it more sensitive to small triggering forces.

A further structural feature fostering response to small triggering forces is shown in FIG. 3, where it will be observed that, in a preferred structure, the notch 17 forms a horizontal finger 19 which engages the round pin 20, the confining surface 19a of the finger 19 having the same curvature as round pin 20 and contacting an arcuate portion of said pin which terminates at point 19b just beyond the vertical diameter of round pin 20, as indicated at 38. Unless the round pin 20 is fully seated within the notch 17 in contact with arcuate surface 19a it must ride out of the notch so that the slightest repositioning of the round pin 20 by some tension imposed on the line will result in a releasing action.

Referring again to FIG. 1 and also with reference to FIG. 5, these figures show the holder with the rod support arm 10 in a generally horizontal position with the main latch mechanism interengaged and maintaining the horizontal position against the tension of spring 23. FIG. 1 will show with particular clarity the auxiliary latch mechanism 22 in a disengaged and ineffective position as will later more fully appear.

The auxiliary latch mechanism is more fully shown in FIG. 4 which is a partial view on an enlarged scale. From FIGS. 1 and 4 it will be seen that the forward end of the rod support arm 10, forward of the latch element 21, carries a depending pin carrying arm 24, this arm hanging down toward the forward end 25 of the extension 15. The forward end of the extension 15 terminates in a finger 26 which has a detent function and the pin carried by the depending arm 24 is identified at 27. As shown in FIG. 4, the auxiliary latch mechanism 22 functions when the forward end of the arm 10 is depressed to permit the pin 27 to be engaged beneath the finger 26. When this is done, and as illustrated in FIG. 4, the latch element 16 is oversized so that the hook finger 19 extends beyond and cannot engage with the round pin 20. On the other hand, if we pivot the latch element 16 to cause the finger 19 to overlie the round pin 20 and then continue this pivotal movement, we thrust the arm 24 forwardly to remove the pin 27 from the reach of the finger 26 so that the round pin 20 can move upwardly under the bias of spring 23 to engage with the finger 19. This engagement is shown in FIG. 1 where it will be seen that the pin 27 has been moved up out of the reach of finger 26.

The arm 24 is pivotally mounted at its upper end identified at 28 and the latch element 16 is pivotally mounted as shown at 36.

Considering FIGS. 4 and 5, it will be seen that the fishing rod 30 is set into the clamps 13 and 14, the line 31 running from the reel 32 out of the line of the pole 30 around the engagement 33 constituted by a pin carried by the end of the latch element 16 remote from the hook 19, the line journeying forward to the forward end of the rod and thence to the water. The rod 11 is thrust into the ground by means of a foot engaging piece 34, the lower end of the post being pointed as shown at 35 to facilitate penetration.

Operation is quite simple in that when the fish takes the line, a small tension imposed on line 31 is transmitted to the pin 33 to cause movement thereof as indicated by arrow A. The resulting pivotal movement causes the hook 19 to release the round pin 20 whereupon the spring 23 pivots the arm 10 into a generally upright position, and the line 31 is freed to move toward the rod 30 effecting a jerk on the line to cause the hook to be set in the mouth of the fish. The released position of the rod holder structure is shown in FIG. 2.

I claim:

1. In a fishing rod holder including a hook-setting mechanism comprising a rod support arm pivotally mounted on a generally vertical post and for movement between a generally horizontal position and a generally upright position, and spring means biasing said arm toward said upright position, the improvement of latch means to hold said arm in said horizontal position against the pressure of said spring, which improvement comprises a rotatable round pin carried by said arm, a pivotally mounted latch element on said post, and a hook carried by said latch element for holding said arm by engagement of said hook with said rotatable pin, said hook defining a notch for receiving said pin, said notch forming a finger which engages said pin and has a confining surface having the same curvature as said pin and contacting an arcuate portion of said pin and which terminates just beyond the vertical diameter of said pin.

2. A fishing rod holder including means to pivot the rod which is held into a more upright position comprising a post with an extension mounted thereon, a rod support arm pivoted to said post at a point intermediate the length thereof, spring means interconnecting one end of said arm with said post to bias said arm toward an upright position and latch means interconnecting the other end of said rod support arm with said extension of said post to hold said arm in a generally horizontal position against the pressure of said spring, said latch means including a main latch mechanism releasable by tension imposed upon a fishing line carried by the rod which is held and an auxiliary safety latch mechanism comprising a pin carrying arm depending from the said other end of said rod support arm and detent means carried by said extension and engageable with said pin, the distance between said arm and said pin being insufficient to permit said detent means to engage said pin when said main latch mechanism is engaged, said auxiliary safety latch mechanism being releasable by swinging movement of said pin carrying arm.

3. A fishing rod holder as recited in claim 2 in which said main latch mechanism comprises a first latch element pivoted at one end to said arm and having its other end free and a second latch element pivoted to said extension at a point intermediate its length, the end of said second latch element remote from said arm carrying means engageable with a fishing line, the other end of said second latch element and the free end of said first latch element being interengageable with one another under tension and releasable by tension imposed on the fishing line.

References Cited

UNITED STATES PATENTS

| 2,657,492 | 11/1953 | Skorr | 43—15 |
| 2,703,465 | 3/1955 | Stefand | 43—15 |
| 2,811,801 | 11/1957 | Daniel | 43—15 |
| 2,918,746 | 12/1959 | Hamrick | 43—15 |
| 3,055,136 | 9/1962 | Scott et al. | 43—15 |

FOREIGN PATENTS 554,797   1/1957   Italy.

SAMUEL KOREN, *Primary Examiner.*

J. H. CZERWONKY, *Assistant Examiner.*